(12) United States Patent
Nakano

(10) Patent No.: US 6,603,612 B2
(45) Date of Patent: Aug. 5, 2003

(54) OBJECT LENS BARREL, OBJECT LENS BARREL DRIVE UNIT AND OPTICAL INFORMATION RECORDING AND REPRODUCING UNIT

(75) Inventor: Ikuo Nakano, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 106 days.

(21) Appl. No.: 09/850,978

(22) Filed: May 8, 2001

(65) Prior Publication Data

US 2001/0040737 A1 Nov. 15, 2001

(30) Foreign Application Priority Data

May 10, 2000 (JP) ........................................ 2000-136679

(51) Int. Cl.[7] .............................. G02B 7/02; G02B 15/14
(52) U.S. Cl. ................... 359/819; 359/819; 359/821; 359/696
(58) Field of Search ................................. 359/696, 661, 359/819, 820, 821, 822, 804, 823, 824, 830, 813, 814; 369/44.14

(56) References Cited

U.S. PATENT DOCUMENTS 6,055,113 A * 4/2000 Yamamoto et al. ......... 359/661
6,130,789 A * 10/2000 Aarts et al. ................. 359/819
2002/0005996 A1 * 1/2002 Kitamura et al. ........... 359/819
2002/0036839 A1 * 3/2002 Kishima et al. ............ 359/819
2002/0071190 A1 * 6/2002 Wada et al. ................ 359/819
2002/0097508 A1 * 7/2002 Wada et al. ................ 359/804

FOREIGN PATENT DOCUMENTS

JP          4355419          12/1992

* cited by examiner

Primary Examiner—Georgia Epps
Assistant Examiner—Gary O'Neill
(74) Attorney, Agent, or Firm—David G. Conlin; Peter J. Manus; Edwards & Angell, LLP

(57) ABSTRACT

A combinational object lens 3 constructed of a first lens 1 and a second lens 2 is formed. The first lens 1 and a first lens barrel 4 for retaining the first lens 1 are fixed by bonding to a second lens barrel 5 for retaining the second lens 2 only via a spacer layer 7 made of an adhesive. With this arrangement, residual aberration of the combinational object lens constructed of a plurality of lenses can be reduced, and this further enables the compacting and reduction in weight of the object lens barrels, an object lens barrel drive unit and an optical information recording and reproducing unit.

11 Claims, 7 Drawing Sheets

OBJECT LENS BARREL, OBJECT LENS BARREL DRIVE UNIT AND OPTICAL INFORMATION RECORDING AND REPRODUCING UNIT

BACKGROUND OF THE INVENTION

The present invention relates to an object lens barrel that includes at least an object lens constructed of a plurality of lenses and retains the object lens, an object lens barrel drive unit and an optical information recording and reproducing unit.

In recent years, there has been an attempt to employ an object lens constructed of a plurality of lenses in order to achieve a high numerical aperture particularly in an optical information recording and reproducing unit.

Japanese Patent Laid-Open Publication No. HEI 4-355419 discloses an object lens barrel that includes at least an object lens for use in such an optical information recording and reproducing unit and retains the object lens. As shown in FIG. 13, this object lens barrel is provided with an object lens constructed of five lenses in total and a barrel 57 for retaining and fixing the lenses.

Such an object lens constructed of a plurality of lenses has conventionally been subjected to positioning by mechanical accuracy including the steps of determining an inter-lens distance by putting the lens surfaces of the lenses in contact with each other and performing decentering and tilting of the lenses by putting reference surfaces of the lenses in contact with the reference surface of each lens provided in the lens barrel and fixing the same.

However, there has been the problem that the object lens has not been able to bring performance into full play as an object lens because optical aberration exists merely through the positioning by mechanical accuracy.

In order to solve this problem, there has been considered a method for reducing spherical aberration by putting a ring-shaped spacer material between lenses and changing the thickness of the spacer material. However, such a method needs a lot of components and incurs an increase in weight of the object lens barrel. The inter-lens distance is specified by the thickness of the spacer material, and therefore, the inter-lens distance cannot be set to an arbitrary distance, also causing residual spherical aberration. Moreover, the fact that the object lens barrel employed for the optical information recording and reproducing unit has a heavy weight also leads to an increase in weight of the movable portion of an object lens barrel drive unit for driving the object lens barrel, consequently reducing an access speed with respect to an optical recording medium.

SUMMARY OF THE INVENTION

The present invention has been made in view of the aforementioned circumstances and has the object of providing an object lens barrel capable of easily executing inter-lens position adjustment and having a small number of components, an object lens barrel drive unit and an optical information recording and reproducing unit.

In order to achieve the above object, there is provided an object lens barrel comprising:

at least a combinational object lens constructed of a plurality of lenses including at least a first lens and a second lens, wherein 'at least one of the first lens and a first lens barrel for retaining the first lens is fixed by bonding to at least one of the second lens or a second lens barrel for retaining the second lens via a spacer layer made of an adhesive.

According to the object lens barrel of the present invention, there can be executed inter-lens decentering, tilting and inter-lens distance adjustment as well as the arbitrary determination of the amount of adjustment, and therefore, the residual aberration can be reduced. Furthermore, the weight of the object lens is smaller than when a spacer of a metal or the like is employed.

Furthermore, according to the object lens drive unit of the present invention, the object lens barrel, which has a compact size and light weight, can be driven at high speed.

Furthermore, according to the optical information recording and reproducing unit of the present invention, the object lens barrel has a compact size and light weight. Therefore, high-speed access can be achieved by driving the object lens barrel at high speed. Furthermore, a high numerical aperture can be achieved, and this enables the recording and reproducing on a high-density optical recording medium.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First Embodiment

The first embodiment of the present invention will be described below with reference to FIGS. 1 through 4.

Figure 1:
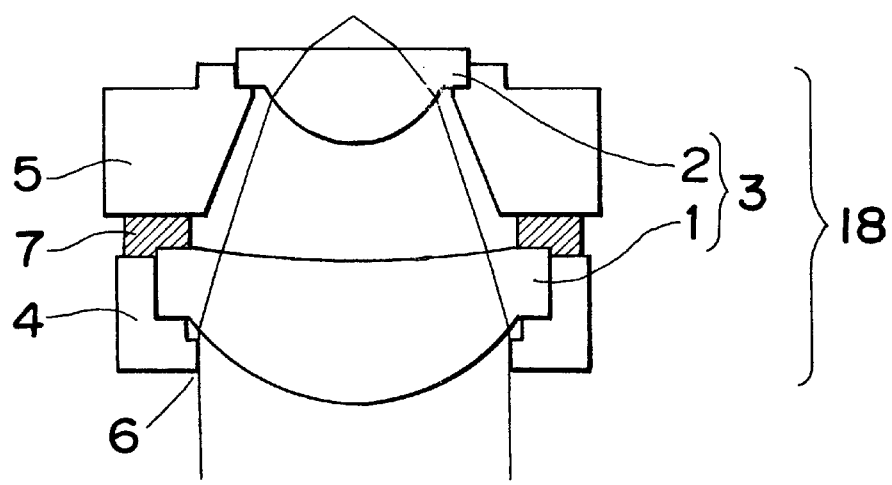
FIG. 1 is an explanatory view of an object lens barrel according to a first embodiment of the present invention.

In an object lens barrel 18 shown in FIG. 1, an object lens 3 is constructed of two lenses of a first lens 1 and a second lens 2. By thus combining a plurality of lenses with one another, an object lens of a high numerical aperture, which has been difficult to achieve with one lens, can be constructed. In this case, the object lens 3 is designed so that light is made incident from the first lens side, to penetrate the second lens that serves as a lens located on the rear focal point side and thereafter form a light convergence point. It is to be noted that the focal point is defined herein as the focal point on the side of the formation of this light convergence point, i.e., the focal point located on the rear side in the following description.

The first lens 1 is retained by a first lens barrel 4. The first lens barrel 4 is further provided with an aperture 6 for limiting the aperture of the object lens. The first lens 1 is positioned by fitting the outer peripheral portion of the lens to the inner peripheral portion of the first lens barrel 4.

On the other hand, the second lens 2 is retained by a second lens barrel 5.

The first lens 1 and the first lens barrel 4 are adjusted in position with respect to the second lens 2 and fixed by bonding to the second lens barrel 5 via only a spacer layer 7 made of an adhesive.

As described above, in the object lens barrel of the present embodiment, the spacer layer 7 for retaining the state in which the lenses are positioned with respect to each other is made of the adhesive. This arrangement enables the decentering, tilting and the retainment and fixing of the inter-lens distance of the lenses in arbitrary states, allowing the residual aberration of the object lens to be reduced.

Dissimilar to a spacer made of metal or the like, a light-weight object lens barrel can be provided.

In this case, the adhesive can be provided by a variety of materials such as a thermosetting resin and an anaerobic setting resin. However, when a photo-curing resin is employed, then it is allowed to apply the resin to the second lens barrel 5 or the first lens barrel 4 (at least one of the first lens barrel and the first lens 1) before lens adjustment, perform positional adjustment between the first lens 1 and the second lens 2 before curing the resin and cure the resin by exposure to light after the positional adjustment. Therefore, accurate positional adjustment can easily be performed. The curing can be achieved in a short time after adjustment, and therefore, aging during the curing can be restrained to the minimum. It is to be noted that the photo-curing resin can be provided by, for example, acrylic resin or a silicone-based resin including a curing initiator.

The photo-curing resin can select the wavelength of light for curing by changing the curing initiator included in the photo-curing resin. However, the photo-curing resin for use in the present embodiment should preferably be a photo-curing resin that is cured only by light in a wavelength band other than the designed wavelength band of the object lens barrel 18. This is for the reasons as follows.

A variety of methods can be considered as a method for executing the positional adjustment between the lens 1 and the lens 2 of the object lens barrel 18. For example, when the adjustment is executed while observing an intensity distribution of the convergence spot of light from the object lens 3 and a photo-curing resin that is cured at the designed wavelength of the object lens 3 is employed, then there is concern about the disadvantageous curing of the resin in the course of adjustment. However, when a photo-curing resin that is cured only by light in the wavelength band other than the designed wavelength of the object lens 3 is employed, then the photo-curing resin can be cured after adjustment by making the lens adjustment light and the light for curing the photo-curing resin have different wavelength bands.

It is to be noted that the designed wavelength mentioned herein means the wavelength of light to be utilized as transmission light of the lenses 1 and 2 in employing the object lens barrel 18. For example, when the object lens barrel 18 is employed in an optical information recording and reproducing unit, the wavelength means the wavelength of a light source for recording and reproducing information on an optical recording medium. Furthermore, it is sometimes the case where light of a varied wavelength is made incident on the object lens 3 for the execution of recording and reproducing on optical recording media of a plurality of types. In the above case, the designed wavelength is set to the wavelength of the shortest wavelength side in order to assemble the object lens 3 normally by light of the shortest wavelength. Therefore, more specifically, the designed wavelength is set to a wavelength of about 780 nm for the CD use object lens barrel, a wavelength of about 650 nm or 635 nm for DVD use or a wavelength of 400 to 410 nm for a blue color use object lens barrel. The designed wavelength is set to a wavelength of about 650 nm or 635 nm for a DVD/CD compatible use object lens barrel.

The wavelength of light for curing the photo-curing resin should preferably be a wavelength other than the designed wavelength as described above. As a concrete example, a photo-curing resin that is cured at a wavelength of, for example, 320 to 380 nm can be employed for the blue color use object lens barrel whose designed wavelength is a wavelength of 400 to 410 nm.

The reason why the object lens barrel 18 is provided with the aperture 6 will be described next.

In general, the aperture of the object lens in an optical information recording and reproducing unit or the like is positioned by fitting a holder of an object lens drive mechanism provided with an aperture to the outer peripheral portion of the object lens. If the method is applied to the case where the object lens barrel constructed of a plurality of lenses like the object of the present invention, it is required to apply a great external force when determining the aperture position by fitting the holder of the object lens drive mechanism to the object lens drive mechanism, and this may disadvantageously cause a displacement between the plurality of lenses of the object lens barrel. Particularly when an adhesive is employed as the spacer layer 7 between lenses as in the present embodiment, the problem becomes serious.

In order to solve the above problem, according to the present embodiment, the first lens barrel 4 for retaining the first lens 1 is provided with the aperture 6 in the case of the object lens barrel 18. Therefore, the positioning of the aperture 6 can be executed in fitting the first lens 1 to the first lens barrel 4, and thereafter, the positioning of the second lens 2 with respect to the first lens and the assembling of the assembly into another device such as an optical information recording and reproducing unit are to be performed. This obviates the need for applying a great external force to position the aperture in the assembling of the assembly into another device, by which the occurrence of displacement between lenses included in the object lens barrel 18 can be restrained.

(First Modification Example)

Figure 2:
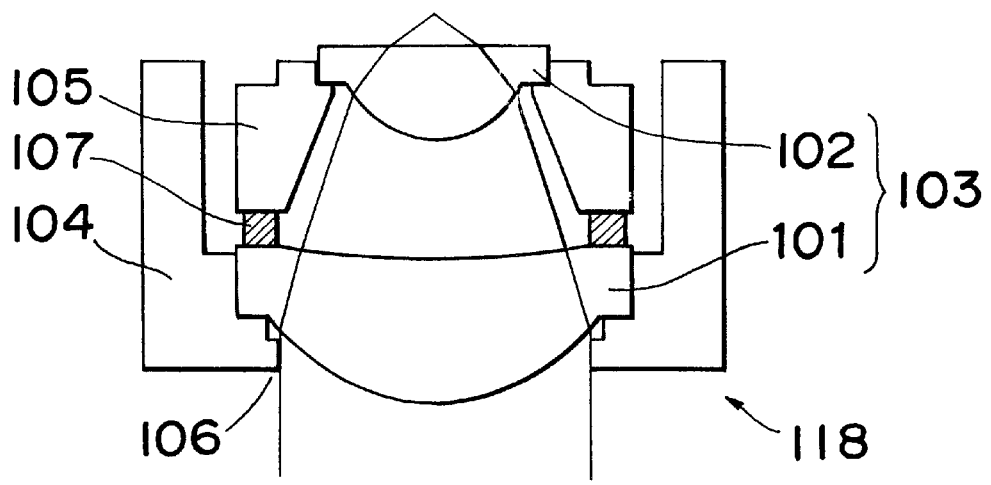
FIG. 2 is an explanatory view of an object lens barrel according to a first modification example of the present invention.

FIG. 2 is a view showing a modification example of the object lens barrel of the present embodiment. In this object lens barrel 118, a second lens barrel 105 and a first lens 101 are fixed by bonding to each other only by an adhesive 107. Further, a first lens barrel 104 is formed so as to cover the entire outer peripheral portion of the lenses (a first lens 101 and a second lens 102).

In the above construction, the portion coated with the spacer layer 107 is located in a portion hidden inside the first lens barrel 104. Therefore, the positional adjustment between the first lens 101 and the second lens 102 and the curing of the spacer layer (adhesive) 107 are hard to achieve. However, when a photo-setting resin is employed as the spacer layer (adhesive) 107 as described above, then the resin can be exposed to light via the lens, allowing the positional adjustment and curing of the adhesive to be easily performed. Furthermore, the resin can be cured in a short time after adjustment, and therefore, aging during the curing can be restrained to the minimum.

(Second Modification Example)

Figure 3:
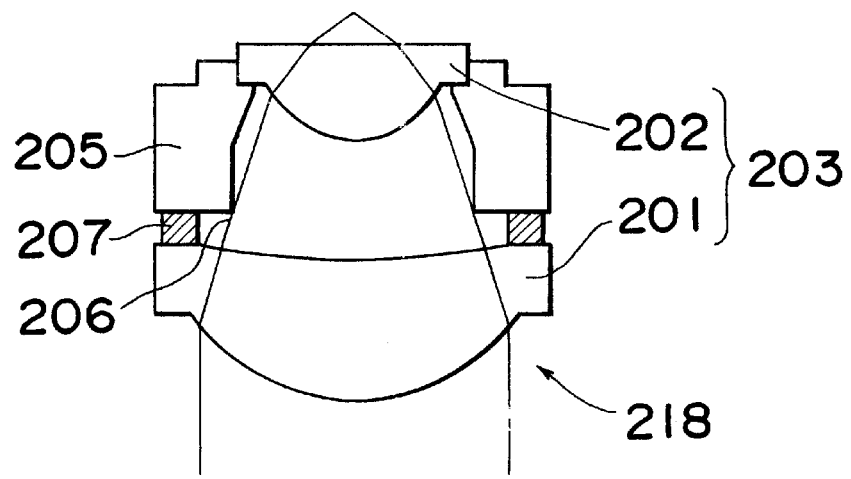
FIG. 3 is an explanatory view of an object lens barrel according to a second modification example of the present invention.

FIG. 3 is a view showing another modification example of the object lens barrel of the present embodiment. Although the aperture 6 is provided for the first lens barrel 4 in the object lens barrel 18 of FIG. 1, an aperture is provided for a second lens barrel 205 in the present modification example. As described above, the lens barrel to be provided with the aperture may be any of the lens barrels for retaining the lenses. However, by providing an aperture 206 for a second lens barrel 205 for retaining a second lens 202 of a small lens outside diameter as in the case of the object lens barrel 218 of the present modification example, the outside diameter of the object lens barrel can be reduced. The same thing can be said for the case of an object lens barrel having three ore more lenses, and it is desirable to form an aperture in a lens barrel for retaining the lens of the smallest lens outside diameter.

In the present modification example, the first lens 201 and the second lens 202 are directly bonded to each other via a spacer layer (adhesive) 207, and no first lens barrel is provided.

(Third Modification Example)

Figure 4:
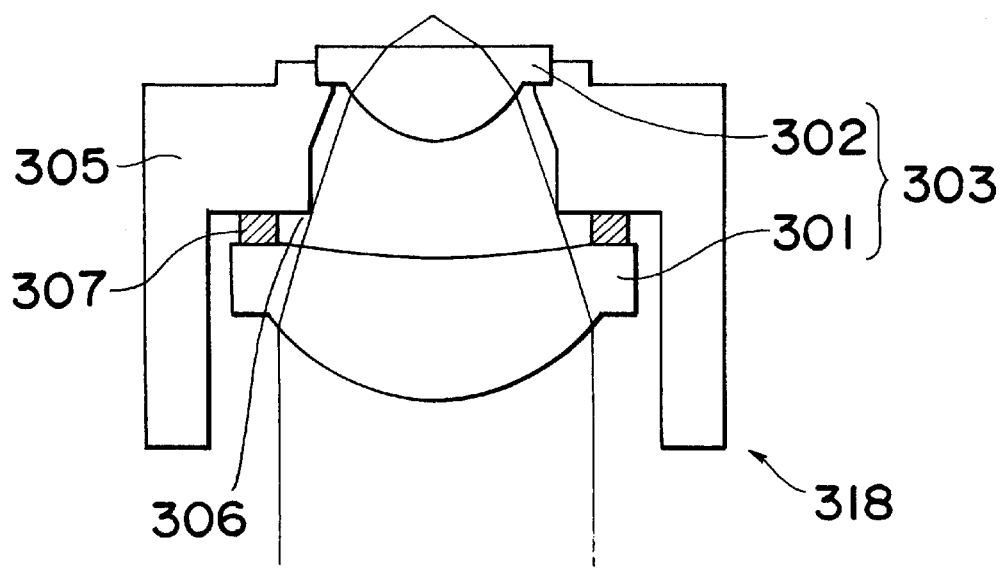
FIG. 4 is an explanatory view of an object lens barrel according to a third modification example of the present invention.

FIG. 4 is a view showing another modification example of the object lens barrel of the present embodiment. In an object lens 303 as shown in FIG. 4, an aperture 306 is provided for a second lens barrel 305 similarly to the one shown in FIG. 3. In the present modification example, the second lens barrel 305 is constructed so as to cover a first lens 301. With this arrangement, no external force is applied to a spacer layer 307 in handling an object lens barrel 318.

Second Embodiment

The second embodiment of the present invention will be described below with reference to FIGS. 5A through 11. The present embodiment obtained by applying the object lens barrel of the present invention to an optical information recording and reproducing unit will be described.

The object lens of the object of the present invention is an object lens constructed of a plurality of lenses. Therefore, the numerical aperture can easily be increased by comparison with an object lens constructed of one lens. Therefore, when the object lens is applied to an optical information recording and reproducing unit, there can be executed recording and reproducing of higher density. When the object lens barrel is employed for an optical information recording and reproducing unit, the object lens barrel is employed by being mounted on an object lens barrel drive unit since focusing and tracking are required to be executed with respect to the tracks of the optical recording medium.

Figure 5B:
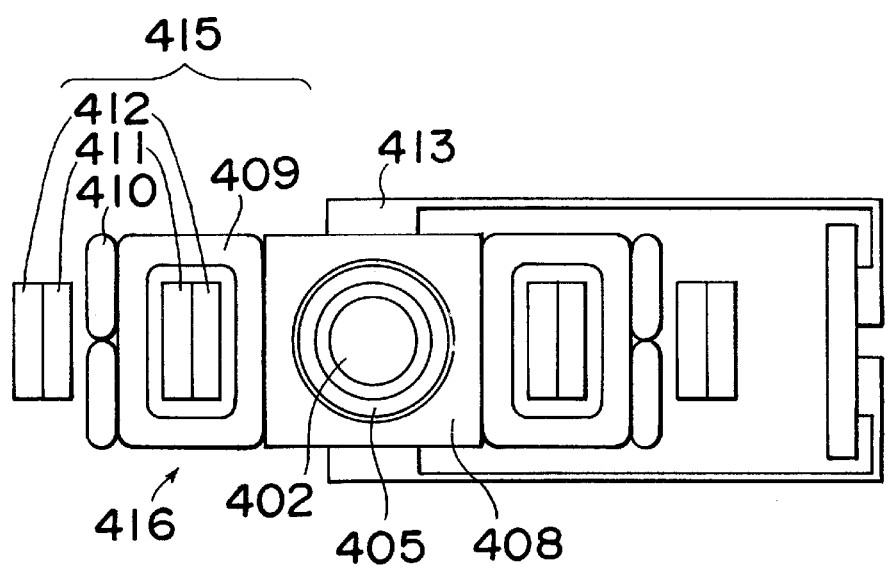
FIGS. 5A and 5B are explanatory views showing an object lens barrel and an object lens barrel drive unit according to a second embodiment of the present invention.
Figure 5A:
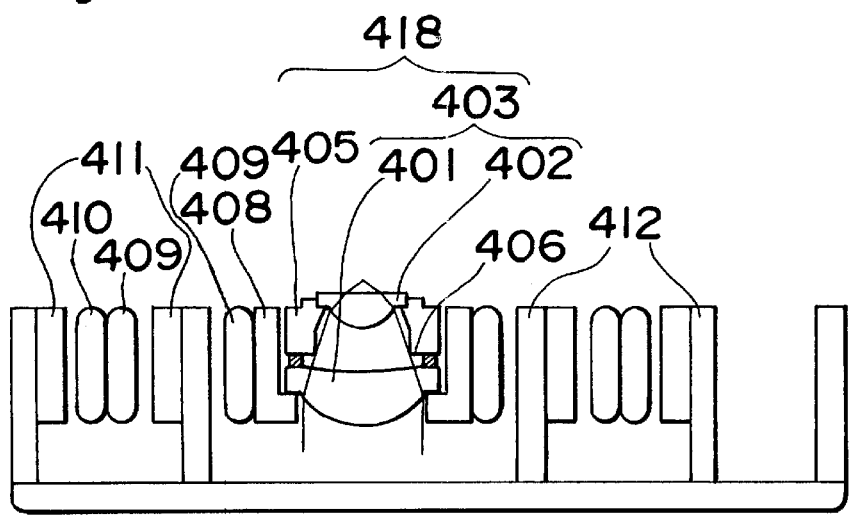

FIG. 5A is a side view showing an object lens barrel drive unit 416, while FIG. 5B is a top view. In FIG. 5A, an object lens barrel 418 is retained in an object lens barrel holder 408.

The object lens barrel holder 408 is driven by a propelling force generating mechanism 415 constructed of a coil, a magnet, a yoke and so on. First, a focus coil 409 is provided for the object lens barrel holder 408, and a radial coil 410 is attached to the focus coil 409. Then, a magnet 411 is attached to a yoke 412. By flowing a drive current through the focus coil 409 and the radial coil 410 via a wire 413 whose one end is fixed to the yoke 412 and the other end of which is fixed to the object lens barrel holder 408, the object lens barrel 418 and the object lens barrel holder 408 are driven.

An aperture 406 of an object lens 403 is provided for a second lens barrel 405. With this arrangement, there is no need for attaching an object lens barrel 418 by fitting to the object lens barrel holder 408. Therefore, no great force is required to be applied when inserting the object lens barrel 418 into the object lens barrel holder 408, and the occurrence of inter-lens displacement can be restrained.

Figure 6:
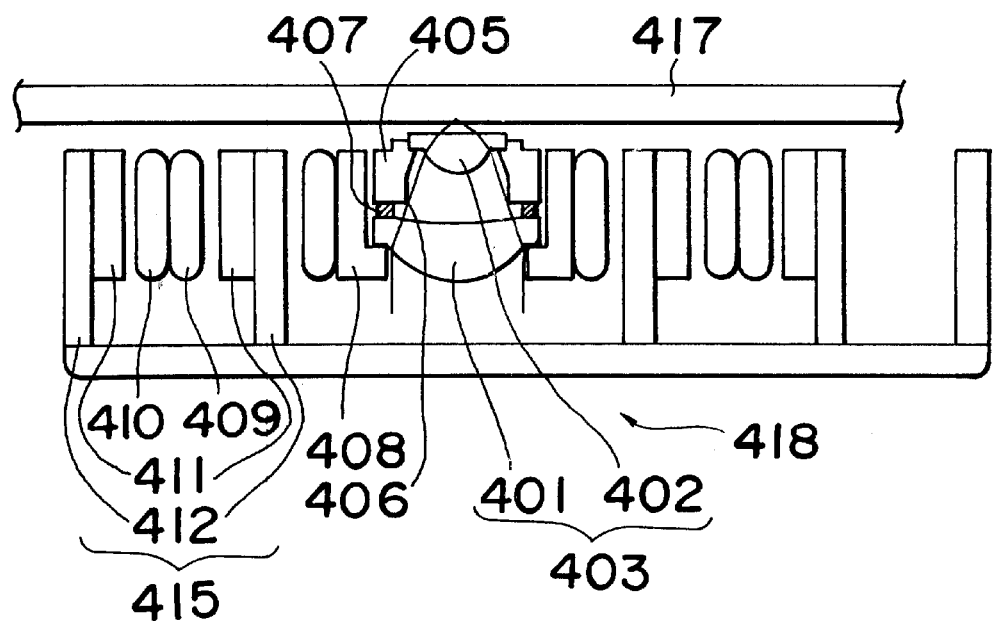
FIG. 6 is an explanatory view showing a positional relation between the object lens barrel drive unit and an optical recording medium in FIG. 5.

FIG. 6 is a side view showing a positional relation between the object lens barrel 418 of FIGS. 5A and 5B and the optical recording medium 417. As shown in this figure, the object lens 403 is driven so as to keep a specified distance to an optical recording medium 417. When the numerical aperture of the object lens 403 is high, it is difficult to set the distance great in terms of design. For example, in the case of the object lens 403 whose numerical aperture is 0.85, a distance (WD: working distance) from a surface that belongs to a second lens 402 and is located on the optical recording medium side to a surface that belongs to the optical recording medium 417 and is located on the second lens side becomes about 0.3 mm. Therefore, the object lens 403 collides against the optical recording medium 417 when focusing servo deviates. In this case, it is possible that the object lens 403 and the optical recording medium 417 may be damaged, and there is further concern about the occurrence of displacement between the lenses by an impact force applied to a spacer layer 407.

A modification example of the object lens barrel and the object lens barrel holder for holding the lens barrel for use in the present embodiment will be described next with reference to FIGS. 7 through 11.

(Fourth Modification Example)

According to the present modification example (FIG. 7) and a modification example as shown in FIGS. 8 through 11, described later, the object lens barrel or the object lens barrel holder is provided with a protecting section protruding on the focal point side of the object lens in order to protect the object lens and the optical recording medium. The protecting sections shown in FIGS. 7 through 11 (present modification example and fourth through eighth modification examples) are each protruding on the optical recording medium side of the second lens with respect to the second lens. By forming the protecting section of a material softer than the object lens, the damage of the optical recording medium is reduced. In general, the object lens is often formed of glass, and therefore, the material constituting the protecting section is made of a material (for example, PPS (polyphenylene sulfide), POM (polyacetal), PTFE (polytetrafluoroethylene)) softer than glass. The protecting section should preferably be formed integrally with the object lens barrel or the object lens barrel holder on which the protecting section is provided in terms of easiness of positional adjustment. However, there may be a construction in which the protecting section is fixed to the tip end of the object lens barrel or the object lens barrel holder by bonding or the like. The protecting section will be described in concrete below.

Figure 7:
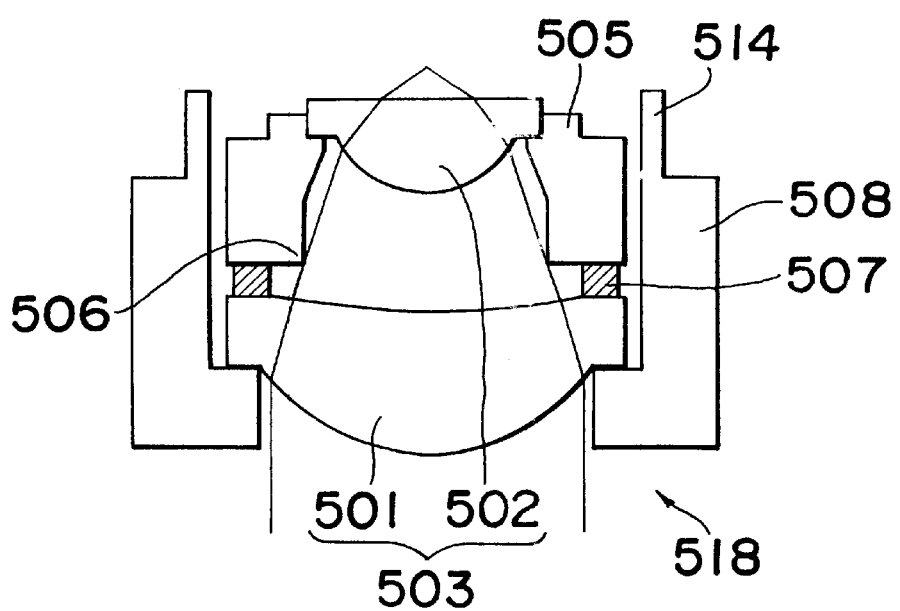
FIG. 7 is an explanatory view of an object lens barrel and an object lens barrel holder according to a fourth modification example of the present invention.

FIG. 7 is an explanatory view showing the present modification example. In the present example, an object lens barrel holder 508 is provided with a protecting section 514. In this case, the protecting section 514 is provided integrally with the object lens barrel holder 508. That is, the protecting section is provided for the object lens barrel holder 508 to which a focus coil and a radial coil constituting a propelling force generating mechanism are attached, without interposition of a spacer layer 507. With this arrangement, no impact force is transferred directly to the spacer layer 507 even when the protecting section 514 collides against an optical recording medium 517. Therefore, the occurrence of displacement between lenses due to an impact force can be reduced.

The above has described the example in which the object lens is constructed of two lenses. However, when the object lens is constructed of a plurality of three or more lenses, by retaining the lens that belongs to the lenses fixed by bonding with the spacer layer and is located on the opposite side of the focal point side or the lens located farther opposite from the focal point side of the above lens by an object lens barrel holder and providing the object lens barrel holder with a protecting section, an impact force when collision occurs can be prevented from being transferred directly to the spacer layer similarly to the aforementioned case.

(Fifth Modification Example)

Figure 8:
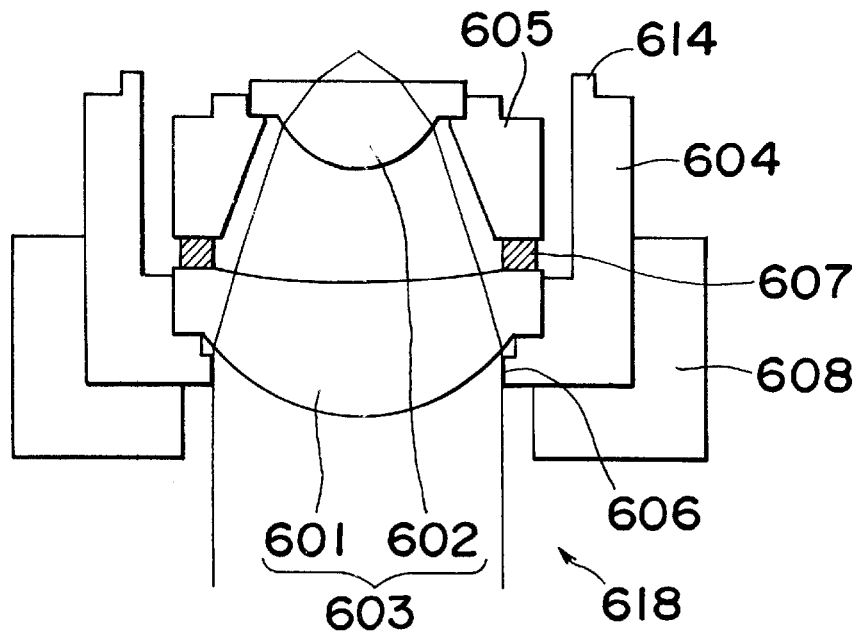
FIG. 8 is an explanatory view of an object lens barrel and an object lens barrel holder according to a fifth modification example of the present invention.

FIG. 8 shows a construction in which a first lens barrel 604 is provided with a protecting section 614. Also, in this case, the first lens barrel 604 provided with the protecting section 614 is attached directly to an object lens barrel holder 608. Therefore, an impact force when the collision occurs is prevented from being transferred directly to the spacer layer 607.

The above has described the example in which the object lens is constructed of two lenses. However, when the object lens is constructed of a plurality of three or more lenses, by retaining the lens barrel for retaining the lens that belongs to the lenses fixed by bonding with the spacer layer and is located on the opposite side of the focal point side or the lens located farther opposite from the focal point side of the above lens by an object lens barrel holder and providing the lens barrel with a protecting section, an impact force when collision occurs can be prevented from being transferred directly to the spacer layer similarly to the aforementioned case.

(Sixth Modification Example)

In the aforementioned modification example, it is difficult to design the working distance to be large when the numerical aperture of the object lens is high. Therefore, the amount of protrusion of the protecting section protruding on the optical recording medium side of the second lens becomes very small. For example, the amount of protrusion is within a range of 0.01 to 0.25 mm when the working distance is 0.3 mm. Therefore, the height of the protecting section is required to be controlled with strict precision with respect to the object lens.

In the case of a combinational object lens constructed of a plurality of lenses, the inter-lens distance is adjusted so that the amount of occurrence of spherical aberration is reduced by adjustment. However, there are manufacturing variations in lens thickness, lens surface curvature and the like in manufacturing lenses, and therefore, the inter-lens distance does not always become constant. For example, in the case of an object lens of a combination of two lenses that have a numerical aperture of 0.85, a variation from the designed value of the inter-lens distance due to the manufacturing variations of lenses becomes about ±0.1 mm. For example, assuming that the height of the protecting section is designed so that the amount of protrusion of the protecting section becomes 0.05 mm and the reference of the height of the protecting section is the reference surface of the first lens, then there is concern about a failure in achieving the specified amount of protrusion as a consequence of a change in lens interval due to the manufacturing variations of lenses. Furthermore, depending on cases, there is concern about the disadvantageous protrusion of the second lens 2 on the optical recording medium side with respect to the protecting section.

Figure 9:
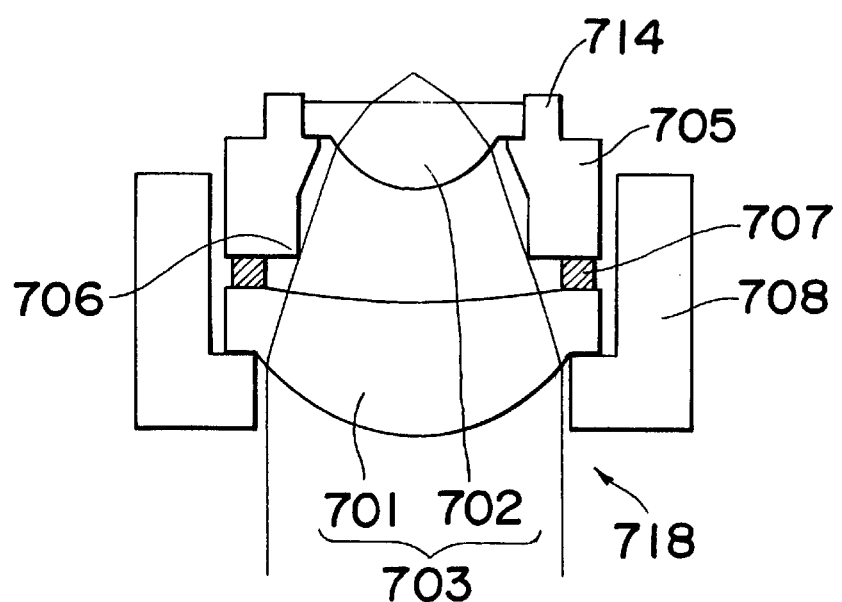
FIG. 9 is an explanatory view of an object lens barrel and an object lens barrel holder according to a sixth modification example of the present invention.

In an object lens barrel 718 of the present modification example shown in FIG. 9, a second lens barrel 705 is provided with a protecting section 714. That is, the height is determined by putting the reference surface of the height of the protecting section 714 in contact with the reference surface of a second lens 702 (the plane of the flange section of the second lens on the incident side in this case). With this arrangement, the amount of protrusion of the protecting section 714 does not suffer the influence of the variation in the amount of adjustment of the inter-lens distance, and therefore, the variation in the amount of protrusion can be reduced.

The above has described the example in which the object lens is constructed of two lenses. However, when the object lens is constructed of a plurality of three or more lenses, by putting the lens located closest to the focal point in contact with the reference surface of the lens barrel for retaining the lens and providing the lens barrel with a protecting section, the variation in the amount of protrusion can be reduced similarly to the aforementioned case.

(Seventh Modification Example)

Figure 10:
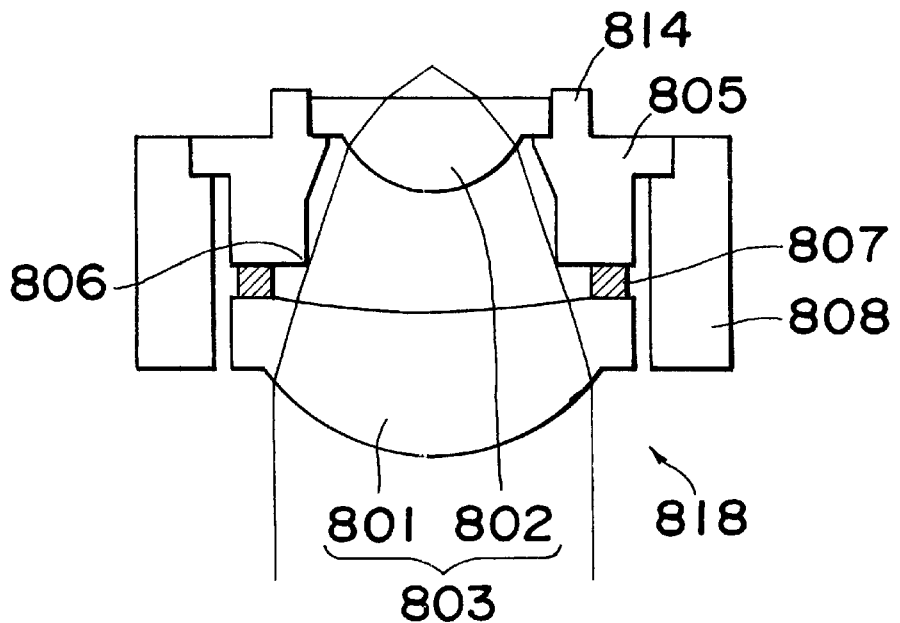
FIG. 10 is an explanatory view of an object lens barrel and an object lens barrel holder according to a seventh modification example of the present invention.

In an object lens barrel 818 as shown in FIG. 10, a second lens barrel 805 provided with a protecting section 814 is attached directly to an object lens barrel holder 808. This arrangement can prevent an impact force from being transferred directly to the spacer layer 807 when the protecting section collides against the optical recording medium. Therefore, the occurrence of displacement between lenses can be prevented.

The height of the protecting section is determined by putting the reference surface of the height of the protecting section 814 in contact with the reference surface of a second lens 802 (the plane of the flange section of the second lens on the incident side in this case). With this arrangement, the amount of protrusion of the protecting section 814 does not suffer the influence of the variation in the amount of adjustment of the inter-lens distance, and therefore, the variation in the amount of protrusion can be reduced.

The above has described the example in which the object lens is constructed of two lenses. However, when the object lens is constructed of a plurality of three or more lenses, by putting the lens located closest to the focal point in contact with the reference surface of the lens barrel that retains the lens and providing the lens barrel with a protecting section, the variation in the amount of protrusion can be reduced similarly to the aforementioned case. Furthermore, by retaining this lens barrel by an object lens barrel holder, an impact force when collision occurs can be prevented from being transferred directly to the spacer layer.

(Eighth Modification Example)

Figure 11:
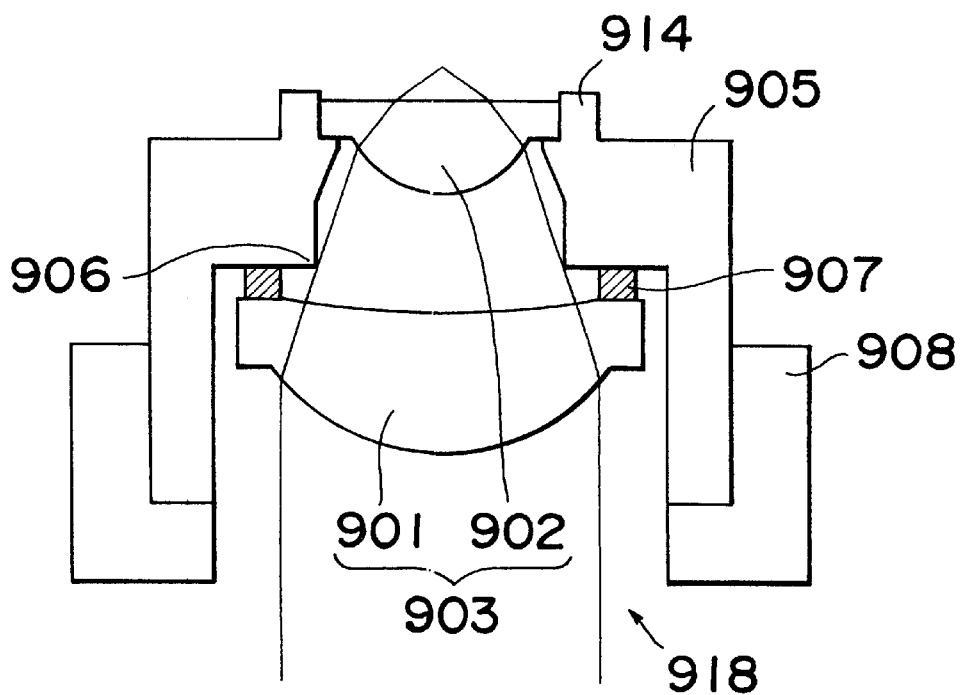
FIG. 11 is an explanatory view of an object lens barrel and an object lens barrel holder according to a eighth modification example of the present invention.

FIG. 11 shows a construction in which a second lens barrel 905 is provided with a protecting section 914 and the outer peripheral portion of a first lens 901 is further covered with a second lens barrel 905. With this arrangement, an external force can be prevented from being applied to a spacer layer 907 in handling an object lens barrel 918. Moreover, the second lens barrel 905 provided with the protecting section 914 is attached directly to an object lens barrel holder 908. This arrangement can prevent an impact force from being transferred directly to the spacer layer 907 when the protecting section collides against the optical recording medium.

The height of the protecting section is determined by putting the reference surface of the height of the protecting section 914 in contact with the reference surface of a second lens 902 (the plane of the flange section of the second lens on the incident side in this case). With this arrangement, the amount of protrusion of the protecting section 914 does not suffer the influence of the variation in the amount of adjustment of the inter-lens distance, and therefore, the variation in the amount of protrusion can be reduced.

The above has described the example in which the object lens is constructed of two lenses. However, when the object lens is constructed of a plurality of three or more lenses, by putting the lens located closest to the focal point in contact with the reference surface of the lens barrel that retains the lens and providing the lens barrel with a protecting section, the variation in the amount of protrusion can be reduced similarly to the aforementioned case. Furthermore, by retaining this lens barrel by the object lens barrel holder, the impact force when collision occurs can be prevented from being transferred directly to the spacer layer.

Third Embodiment

The third embodiment of the present invention will be described below with reference to FIG. 12.

Figure 12:
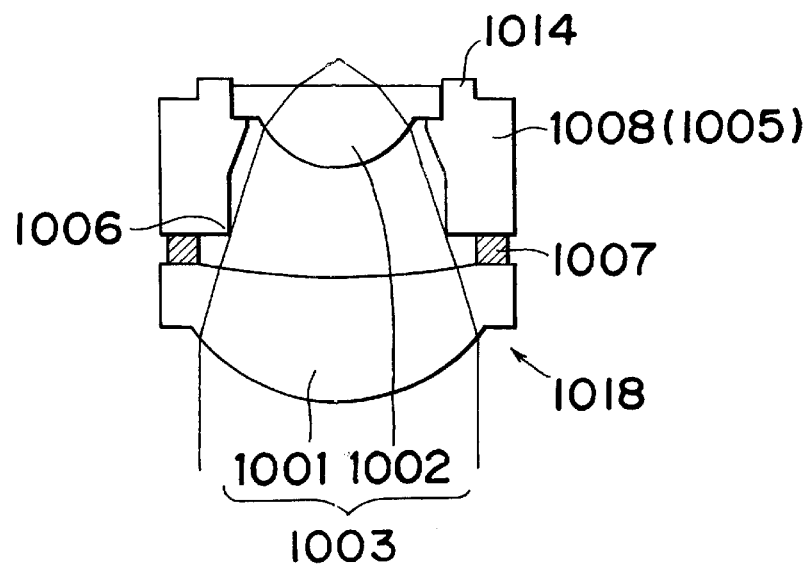
FIG. 12 is an explanatory view of an object lens barrel holder that concurrently serves as a lens barrel and an object lens barrel holder, constituting an object lens barrel according to a third embodiment of the present invention.
Figure 13:
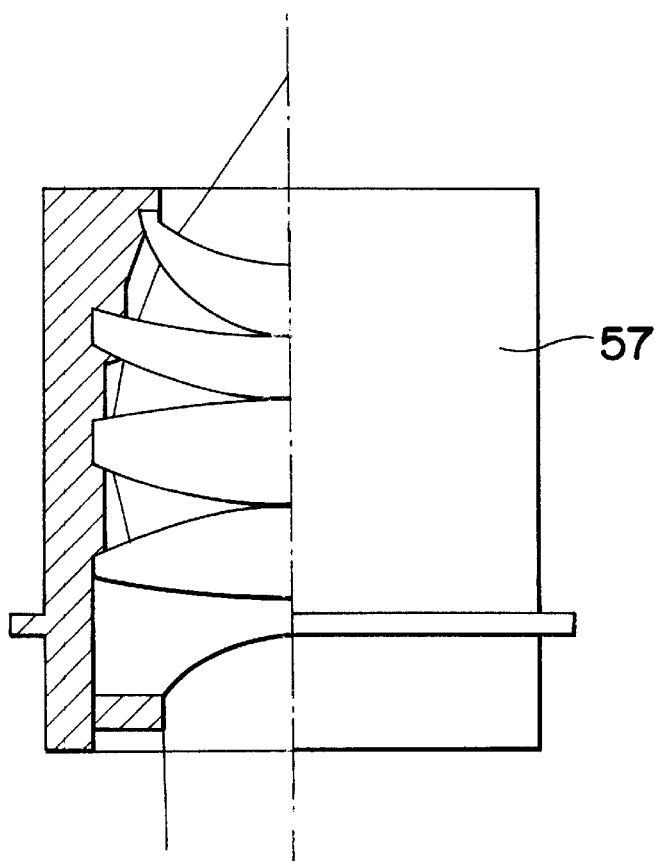
FIG. 13 is an explanatory view of a conventional object lens barrel.

FIG. 12 is a view showing the construction of the present embodiment. In this case, an object lens barrel holder 1008 corresponding to the object lens barrel holder 408 of the second embodiment serves also as a second lens barrel 1005. That is, a lens constituting an object lens is attached directly to the object lens barrel holder 1008 it to which a propelling force generating mechanism of an object lens barrel drive mechanism is attached.

In FIG. 12, a second lens 1002 having a lens outside diameter smaller than that of a first lens 1001 is attached to the object lens barrel holder 1008, and therefore, the diameter of an entrance through which the lens is inserted can be reduced. Therefore, the object lens barrel drive unit can be reduced in size. The number of components of the object lens barrel drive unit can also be reduced. Furthermore, the weight of the movable portion can be reduced, and the strength of the object lens barrel holder 1008 can be increased since the diameter of the entrance is small. Therefore, driving at a higher speed can be achieved.

In this case, positioning is achieved by fitting the outer peripheral portion of the second lens 1002 to the inner peripheral portion of the lens entrance of the object lens barrel holder 1008, and the second lens 1002 is fixed to the object lens barrel holder 1008 provided with an aperture 1006. In the object lens barrel and the object lens barrel drive unit of the present case, the object lens barrel holder 1008 and the first lens 1001 can be assembled by adjusting with handling and thereafter fixing with bonding. That is, after performing the fitting of the outer peripheral portion of the second lens 1002 to the inner peripheral portion of the lens entrance of the object lens barrel holder 1008, the positional relation between the first lens 1001 and the second lens 1002 can be adjusted. Therefore, by comparison with the case where positioning is performed by adjusting the positional relation between the first and second lenses and thereafter inserting the lens barrel into the aperture, the possible occurrence of displacement between the first and second lenses 1001 and 1002 can be restrained.

Even in this construction, the object lens barrel holder 1008 is provided with a protecting section 1014. Therefore, an impact force can be prevented from being transferred directly to a spacer layer 1007 when the protecting section collides against the optical recording medium.

The reference of the height of the protecting section 1014 is set to the reference surface of the second lens 1002 (the plane of a flange section of the second lens on the incident side). With this arrangement, the variation in the amount of protrusion of the protecting section 1014 can be reduced.

The first lens 1001 and the second lens 1002 of FIG. 12 correspond to the first lens and the second lens, respectively, claimed in the claim 8. However, considering the first lens and the second lens of the claim 8 as the lenses located on the focal point side and the lens located on the opposite side of the focal point, the claim 8 corresponds to the fourth modification example described in connection with FIG. 7.

Although the second and third embodiments have described the 4-wire type object lens barrel drive system, the drive system may be an object lens barrel drive unit of a shaft slide type or a hinge spring type.

Although the object lens constructed of two lenses has been described, there may be an object lens constructed of a greater number of lenses. In the above case, at least one of a certain lens and a lens barrel for retaining the lens is merely required to be fixed by bonding to at least one of another lens and a lens barrel for retaining the lens only via a spacer layer constructed of an adhesive.

The object lens protecting section provided for the lens barrel or the object lens barrel holder has been described. However, the protecting section may be provided by sticking a protective film or applying a coating agent to the surface located on the rear focal point side of the lens located on the rear focal point side of the object lens. Even in the above case, the variation in the amount of protrusion of the protecting section due to the variation in the inter-lens distance caused by the adjusting of the inter-lens distance can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An object lens barrel comprising:
   at least a combinational object lens constructed of a plurality of lenses including at least a first lens and a second lens, wherein
      at least one of the first lens and a first lens barrel for retaining the first lens is fixed by bonding to at least one of the second lens or a second lens barrel for retaining the second lens via a spacer layer made of an adhesive.

2. An object lens barrel as claimed in claim 1, wherein the spacer layer is made of a photo-curing resin cured only by light in a wavelength band other than a designed wavelength of the combinational object lens.

3. An object lens barrel as claimed in claim 1, wherein the combinational object lens is provided with an aperture, and the aperture is formed in a lens barrel for retaining at least one lens constituting the combinational object lens.

4. An object lens barrel as claimed in claim 3, wherein the lens barrel provided with the aperture retains a lens of a smallest lens outside diameter among the plurality of lenses constituting the combinational object lens.

5. An object lens barrel as claimed in claim 1, wherein the second lens is arranged on a focal point side of the combinational object lens with respect to the first lens, and the lens barrel for retaining the first lens or a lens barrel for retaining a lens positioned on the opposite side of the focal point side of the first lens is provided with a protecting section protruding on the focal point side of the lens that is positioned closest to the focal point and belongs to the lenses constituting the combinational object lens.

6. An object lens barrel as claimed in claim 1, wherein a protecting section protruding on a focal point side of a focal point side lens that is positioned closest to the focal point and belongs to the lenses constituting the combinational object lens is provided, and the protecting section is formed so that its reference surface is put in contact with a reference surface of the focal point side lens.

7. An object lens barrel drive unit comprising:

the object lens barrel claimed in claim 1, a propelling force generating mechanism for driving the object lens barrel, and an object lens barrel holder that is fixed to the propelling force generating mechanism and retains the object lens barrel.

8. An object lens barrel drive unit comprising:

the object lens barrel claimed in claim 1, a propelling force generating mechanism for driving the object lens barrel, and an object lens barrel holder that is fixed to the propelling force generating mechanism and retains the object lens barrel, wherein the second lens is arranged on a focal point side of the combinational object lens, the object lens barrel holder retains at least one of the first lens, a lens positioned on the opposite side of the focal point side of the first lens, the lens barrel for retaining the first lens and a lens barrel for retaining a lens positioned on the opposite side of the focal point side of the first lens, and the object lens barrel holder is provided with a protecting section protruding on the focal point side of the focal point side lens that is positioned closest to the focal point and belongs to the lenses constituting the combinational object lens.

9. An object lens barrel drive unit comprising:

the object lens barrel claimed in claim 1, a propelling force generating mechanism for driving the object lens barrel, and an object lens barrel holder that is fixed to the propelling force generating mechanism and retains the object lens barrel, wherein the object lens barrel has a focal point side lens barrel for retaining a focal point side lens that is positioned closest to the focal point and belongs to the lenses constituting the combinational object lens, the focal point side lens barrel is formed so that its reference surface is put in contact with a reference surface of the focal point side lens, the focal point side lens is provided with a protecting section protruding on the focal point side of the focal point side lens, and the object lens barrel holder retains the focal point side lens holder.

10. An object lens barrel drive unit comprising:

an object lens barrel provided with at least a combinational object lens constructed of a plurality of lenses including at least a first lens and a second lens, and a propelling force generating mechanism for driving the object lens barrel, wherein the object lens barrel is formed in a manner that a second lens barrel for retaining a second lens is fixed by bonding to at least one of the first lens and the first lens barrel for retaining the first lens only via a spacer layer made of an adhesive, and the second lens barrel concurrently serves as an object lens barrel holder for retaining the object lens barrel fixed to the propelling force generating mechanism and constitutes an aperture of the combinational object lens.

11. An optical information recording and reproducing unit for executing at least one of recording and reproducing of information on an optical recording medium, the unit comprising:

the object lens barrel drive unit of claim 7.

* * * * *